(12) United States Patent
Itzkovitz et al.

(10) Patent No.: US 7,865,188 B2
(45) Date of Patent: Jan. 4, 2011

(54) CONVERGENCE OF ANCILLARY CALL SERVICES ACROSS MULTIPLE COMMUNICATION DOMAINS

(75) Inventors: Ayal Itzkovitz, Haifa (IL); Shlomo Livne, Ra'anana (IL); Tzach Livyatan, Tel Aviv (IL); Guy Ray, Ramat Gan (IL); Leonid Voldman, Haifa (IL); Tal Zoller, Haifa (IL)

(73) Assignee: Oracle Israel Ltd., Petach Tikva (IL)

( * ) Notice: Subject to any disclaimer, the term of this patent is extended or adjusted under 35 U.S.C. 154(b) by 0 days.

(21) Appl. No.: 12/551,588

(22) Filed: Sep. 1, 2009

(65) Prior Publication Data

US 2009/0316693 A1 Dec. 24, 2009

Related U.S. Application Data

(63) Continuation-in-part of application No. 11/362,273, filed on Feb. 24, 2006, now abandoned, which is a continuation of application No. PCT/IL2006/000079, filed on Jan. 19, 2006.

(60) Provisional application No. 60/645,024, filed on Jan. 21, 2005.

(51) Int. Cl.
*H04W 4/00* (2009.01)
(52) U.S. Cl. .............. 455/435.1; 455/432.1; 455/432.2; 455/432.3; 455/433
(58) Field of Classification Search .............. 455/435.1, 455/432.1, 432.2, 432.3, 433
See application file for complete search history.

(56) References Cited

U.S. PATENT DOCUMENTS 5,566,235 A 10/1996 Hetz (Continued)

FOREIGN PATENT DOCUMENTS

WO 9921345 A1 4/1999

(Continued)

OTHER PUBLICATIONS

Annex B of Standard EN 301 140-1 V1.3.4, "Intelligent Network (IN): Intelligent Network Aplication Protocol (INAP); Capability Set 2 (CS2); Part 1: Protocol Sepcification", European Telecommunications Standards Institute (ETSI-Sophia Antipolis, France), Jun. 1999.

(Continued)

*Primary Examiner*—Barry W Taylor
(74) *Attorney, Agent, or Firm*—D. Kligler I.P. Services Ltd

(57) ABSTRACT

A method for communication in an environment including a circuit-switched network and a packet-switched network, both of which include a respective connectivity layer including one or more switching elements and a respective service layer including one or more service platforms. A request is accepted to set up a call for a communication terminal associated with one or more of the networks. The call is established responsively to the request via one or more of the switching elements. At least one service platform in the service layer of the circuit-switched network is invoked to provide a first ancillary call service to the call, and at least one second service platform in the service layer of the packet-switched network is invoked to provide a second ancillary call service to the call.

22 Claims, 3 Drawing Sheets

U.S. PATENT DOCUMENTS

| | | | |
|---|---|---|---|
| 6,115,746 | A | 9/2000 | Waters et al. |
| 6,226,373 | B1 | 5/2001 | Zhu et al. |
| 6,366,658 | B1 | 4/2002 | Bjornberg et al. |
| 6,418,205 | B2 | 7/2002 | Capers et al. |
| 6,661,785 | B1 | 12/2003 | Zhang et al. |
| 6,940,847 | B1 | 9/2005 | Glitho et al. |
| 6,963,583 | B1* | 11/2005 | Foti .......................... 370/467 |
| 6,967,972 | B1 | 11/2005 | Volftsun et al. |
| 6,990,124 | B1 | 1/2006 | Dalias et al. |
| 7,161,925 | B2 | 1/2007 | Wallenius et al. |
| 7,447,513 | B2 | 11/2008 | Anttila et al. |
| 7,466,991 | B2 | 12/2008 | Everson et al. |
| 7,496,111 | B2 | 2/2009 | Itzkovitz et al. |
| 7,620,391 | B2 | 11/2009 | Itzkovitz et al. |
| 2001/0017483 | A1 | 8/2001 | Frohberg |
| 2003/0093563 | A1 | 5/2003 | Young et al. |
| 2003/0128694 | A1 | 7/2003 | Hundscheidt et al. |
| 2004/0006623 | A1 | 1/2004 | Gourddaud et al. |
| 2004/0176089 | A1 | 9/2004 | Sylvain |
| 2004/0204095 | A1 | 10/2004 | Cyr et al. |
| 2004/0219948 | A1 | 11/2004 | Jones et al. |
| 2004/0246990 | A1 | 12/2004 | Krishnamurthi et al. |
| 2005/0009520 | A1 | 1/2005 | Herrero et al. |
| 2006/0104306 | A1* | 5/2006 | Adamczyk et al. .......... 370/466 |
| 2006/0105766 | A1 | 5/2006 | Azada et al. |
| 2006/0229078 | A1 | 10/2006 | Itzkovitz et al. |
| 2006/0276193 | A1 | 12/2006 | Itzkovitz et al. |
| 2007/0263599 | A1 | 11/2007 | Itzkovitz et al. |
| 2007/0280154 | A1 | 12/2007 | Gupta et al. |
| 2010/0041428 | A1* | 2/2010 | Chen et al. .................. 455/522 |

FOREIGN PATENT DOCUMENTS

| | | |
|---|---|---|
| WO | 0042760 A1 | 7/2000 |
| WO | 2006077587 A2 | 7/2006 |

OTHER PUBLICATIONS

ETSI TS 123 228 V7.2.0, "Digital Cellular Telecommunications System (Phase 2+); Universal Mobile Telecommunications System (UMTS); IP Multimedia Subsystem (IMS); Stage 2 (3GPP TS 23.228 version 7.2.0 Release 7)", Technical Specification, Sophia Antipolis, France, Dec. 2005.

Faynberg et al., "The Development of the Wireless Intelligent Network (WIN) and its Relation to the International Intelligent Network Standards", Bell Labs Technical Journal, pp. 57-80, Summer 1997.

Itzkovitz et al., U.S. Appl. No. 61/181,302 "Delivering SIP services over IN" filed on May 27, 2009.

Parlay Group Inc., "Parlay APIs 2.1: Generic Call Control Service Interfaces", Version 2.1, Jun. 26, 2000.

Perdikeas et al., "Parlay-based service engineering in a converged Internet-PSTN environment", Computer Networks 35, pp. 565-578, year 2001.

Rosenberg et al., "SIP: Session Initiation Protocol", Network Working Group, RFC 3261, Jun. 2002.

"Wireless Application Protocol. Wireless Telephony Application Specification", WAP WTA, pp. 36-37, Version Nov. 8, 1999.

Zhu et al., "IIN model: modifications and case study", Computer Networks 35, pp. 507-519, year 2001.

European Patent Application No. 01958333 Official Action dated Jan. 2, 2008.

European Patent Application No. 01958333 Search Report dated Sep. 3, 2007.

International Application PCT/IL2001/000723 Search Report dated Jun. 21, 2002.

International Application PCT/IL2006/000079 Patentability Report dated Aug. 6, 2009.

International Application PCT/IL2006/000079 Search Report dated Jul. 1, 2008.

U.S. Appl. No. 10/344,291 Official Action dated Feb. 8, 2007.
U.S. Appl. No. 10/344,291 Official Action dated Jun. 12, 2008.
U.S. Appl. No. 10/344,291 Official Action dated Oct. 4, 2007.
U.S. Appl. No. 11/361,690 Official Action dated Jan. 9, 2009.
U.S. Appl. No. 11/361,690 Official Action dated Jun. 19, 2008.
U.S. Appl. No. 11/361,839 Advisory Action dated Jun. 11, 2009.
U.S. Appl. No. 11/361,839 Official Action dated Jun. 19, 2008.
U.S. Appl. No. 11/361,839 Official Action dated Mar. 31, 2009.
U.S. Appl. No. 11/362,273 Official Action dated Jun. 19, 2008.
U.S. Appl. No. 11/362,273 Official Action Mar. 6, 2009.

Lucent Technologies Inc., "IP Multimedia Subsystem (IMS) Service Architecture" White Paper, USA, Feb. 2005.

U.S. Appl. No. 12/788,330 "Providing session-based services to event-based networks using partial information" filed on May 27, 2010.

U.S. Appl. No. 12/788,331 "Providing session-based services to event-based networks in multi-leg calls" filed on May 27, 2010.

U.S. Appl. No. 12/788,332 "Providing session-based service orchestration to event-based networks" filed on May 27, 2010.

* cited by examiner

CONVERGENCE OF ANCILLARY CALL SERVICES ACROSS MULTIPLE COMMUNICATION DOMAINS

CROSS-REFERENCE TO RELATED APPLICATIONS

This application is a Continuation In Part (CIP) of U.S. patent application Ser. No. 11/362,273, filed Feb. 24, 2006, which is a continuation of PCT Application PCT/IL2006/000079, filed Jan. 19, 2006, which claims the benefit of U.S. Provisional Patent Application 60/645,024, filed Jan. 21, 2005. The disclosures of all these patent applications are incorporated herein by reference.

FIELD OF THE INVENTION

The present invention relates generally to communication networks, and particularly to methods and systems for providing communication services across multiple communication domains.

BACKGROUND OF THE INVENTION

Several concepts and architectures are known in the art for providing communication services over communication networks. For example, the Intelligent Network (IN) is an architectural concept that enables real-time execution of network services and customer applications in a distributed environment of interconnected computers and switching systems, such as wireline and wireless telephone networks. IN standards have been promulgated by the International Telecommunications Union (ITU-T) and by the American National Standards Institute (ANSI). The IN concept is described, for example, by Faynberg et al., in "The Development of the Wireless Intelligent Network (WIN) and Its Relation to the International Intelligent Network Standards," Bell Labs Technical Journal, Summer, 1997, pages 57-80, which is incorporated herein by reference.

Another example of a standardized service provisioning architecture is the Internet Protocol Multimedia Subsystem (IMS) architecture. The IMS architecture is defined and described in a $3^{rd}$ Generation Partnership Project (3GPP) standard entitled "Technical Specification Group Services and System Aspects; IP Multimedia Subsystem (IMS); Stage 2 (Release 7)," 3GPP TS 23.228, version 7.2.0, December 2005. The IP multimedia core network (IM CN) subsystem enables Public Land-Mobile Network (PLMN) operators to offer their subscribers multimedia services based on and built upon Internet applications, services and protocols.

The IMS architecture is described, for example, in a white-paper published by Lucent Technologies Inc. (Murray Hill, N.J.) entitled "IP Multimedia Subsystem (IMS) Service Architecture," February, 2005, which is incorporated herein by reference.

U.S. Pat. No. 6,963,583, whose disclosure is incorporated herein by reference, describes a generic call server in a hybrid 2G/3G telecommunications network having a plurality of network components that utilize a plurality of different signaling protocols. The call server performs call-control functions and interfaces between any two network components selected from the plurality of components. A Generic Call-control State Machine (GCSM) performs call-control functions that are common to all of the protocols.

SUMMARY OF THE INVENTION

In many practical situations, a service provider or other organization operates two or more communication networks conforming to different standards, protocols or access methods. For example, a service provider may operate both wireline and wireless networks, or may be in the process of migrating from a legacy network to a new-generation network. In such applications, it is often desirable to converge and unify the services provided by these networks, as well as the management of subscribers and communication terminals. Embodiments of the present invention provide methods and systems for service-level convergence of communication networks. In some embodiments, ancillary call services carried out by service platforms in different communication networks are invoked and offered to a terminal, regardless of the network affiliation of the terminal. In particular, services carried out by service platforms in networks conforming to different communication domains are invoked and provided during a single call or session.

There is therefore provided, in accordance with an embodiment of the present invention, a method for communication in an environment including a circuit-switched network, which includes a first connectivity layer including one or more first switching elements and a first service layer including one or more first service platforms, and a packet-switched network, which includes a second connectivity layer including one or more second switching elements and a second service layer including one or more second service platforms. The method includes accepting a request to set up a call for a communication terminal associated with one or more of the networks and establishing the call responsively to the request via one or more of the switching elements. At least one of the first service platforms in the first service layer of the circuit-switched network is invoked to provide a first ancillary call service to the call, and at least one of the second service platforms in the second service layer of the packet-switched network is invoked to provide a second ancillary call service to the call.

In one embodiment, the circuit-switched network operates in accordance with a signaling system 7 (SS7) protocol. Typically, the one of the first service platforms includes a service control point (SCP) and the first ancillary call service includes an intelligent network (IN) service.

Additionally or alternatively, the packet-switched network includes an Internet Protocol (IP) network, and the one of the second service platforms includes a Session Initiation Protocol (SIP) Application Server (AS).

The packet-switched network may include an IP Multimedia Subsystem (IMS) network. Additionally or alternatively, the networks may include a Long-Term Evolution (LTE) network.

In disclosed embodiments, the first and second ancillary call services are selected from a group of service types consisting of a payment-related service, an abbreviated dialing service, a Virtual Private Network (VPN) service, a private dialing plan, a shared directory service, an Interactive Voice Response (IVR) service, a call screening service, a multiple call appearance service, an Automatic Call Distribution (ACD) service and an attendant service.

There is also provided, in accordance with an embodiment of the present invention, a convergence server, including first and second network interfaces, which are respectively arranged to communicate with a circuit-switched network and a packet-switched network, wherein the circuit-switched network includes a first connectivity layer including one or more first switching elements and a first service layer including one or more first service platforms, and wherein the packet-switched network includes a second connectivity layer including one or more second switching elements and a second service layer including one or more second service platforms. A processor is arranged to accept a request to set up a call for a communication terminal associated with one or more of the networks, to establish the call responsively to the request via one or more of the switching elements, and to invoke at least one of the first service platforms in the first service layer of the circuit-switched network to provide a first ancillary call service to the call, and at least one of the second service platforms in the second service layer of the packet-switched network to provide a second ancillary call service to the call.

There is additionally provided, in accordance with an embodiment of the present invention, a communication system, including a circuit-switched network, which includes a first connectivity layer including one or more first switching elements and a first service layer including one or more first service platforms, and a packet-switched network, which includes a second connectivity layer including one or more second switching elements and a second service layer including one or more second service platforms. A convergence server is connected to the circuit-switched and packet-switched networks and is arranged to accept a request to set up a call for a communication terminal associated with one or more of the networks, to establish the call responsively to the request via one or more of the switching elements, and to invoke at least one of the first service platforms in the first service layer of the circuit-switched network to provide a first ancillary call service to the call, and at least one of the second service platforms in the second service layer of the packet-switched network to provide a second ancillary call service to the call.

There is further provided, in accordance with an embodiment of the present invention, a computer software product for communication, the product including a computer-readable medium, in which program instructions are stored, which instructions, when read by a computer, cause the computer to communicate with a circuit-switched network that includes a first connectivity layer including one or more first switching elements and a first service layer including one or more first service platforms, to communicate with a packet-switched network that includes a second connectivity layer including one or more second switching elements and a second service layer including one or more second service platforms, to accept a request to set up a call for a communication terminal associated with one or more of the networks, to establish the call responsively to the request via one or more of the switching elements, and to invoke at least one of the first service platforms in the first service layer of the circuit-switched network to provide a first ancillary call service to the call, and at least one of the second service platforms in the second service layer of the packet-switched network to provide a second ancillary call service to the call.

The present invention will be more fully understood from the following detailed description of the embodiments thereof, taken together with the drawings in which:

DETAILED DESCRIPTION OF EMBODIMENTS

System Description

Figure 1:
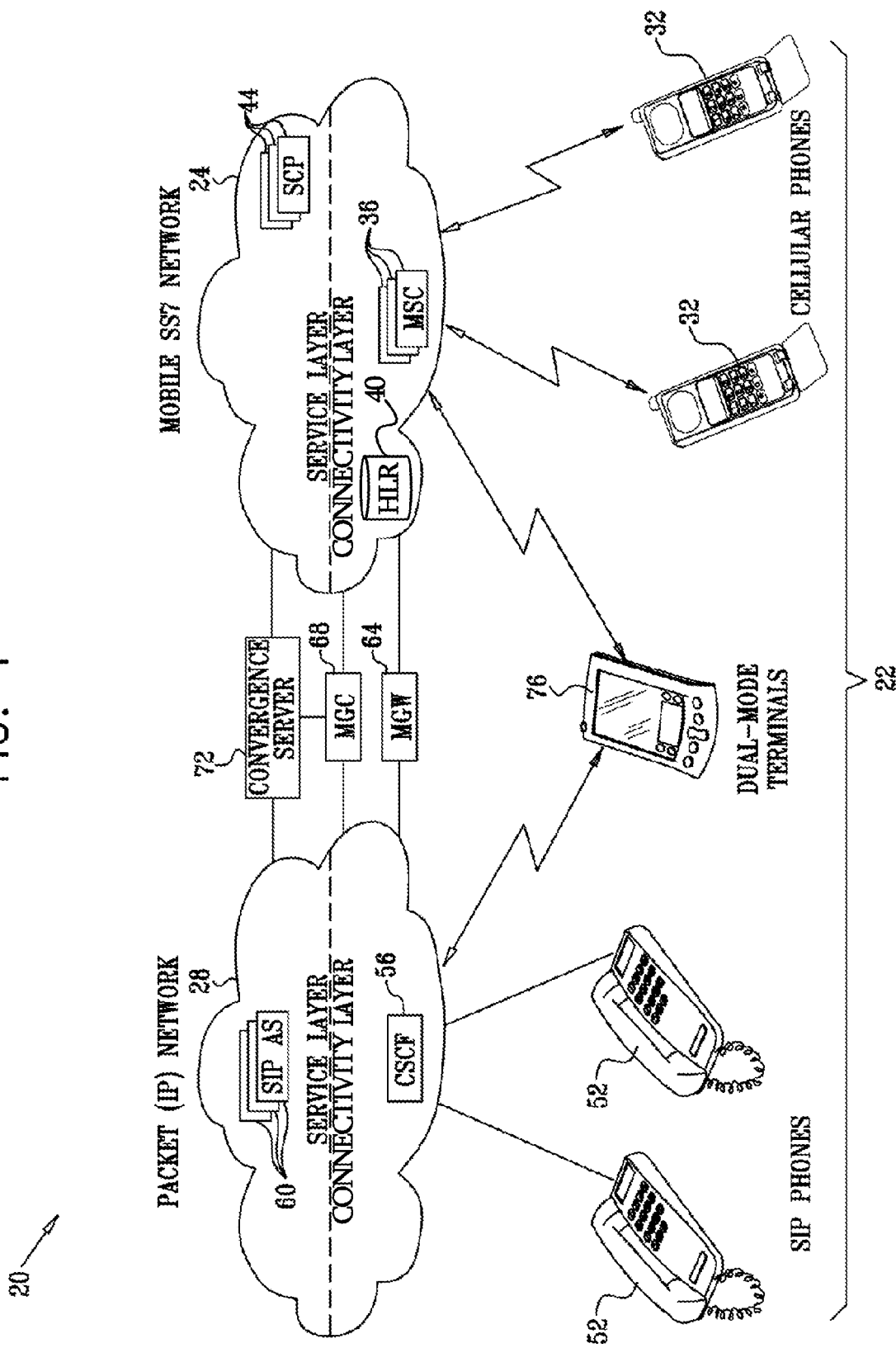
FIG. 1 is a block diagram that schematically illustrates a communication system, in accordance with an embodiment of the present invention.

FIG. 1 is a block diagram that schematically illustrates a communication system 20, in accordance with an embodiment of the present invention. System 20 provides connectivity as well as various communication services (also referred to as ancillary call services) to communication terminals 22. System 20 comprises two or more networks conforming to respective communication domains. Each communication domain is characterized by a particular standard, protocol or access method. For example, in the configuration of FIG. 1, system 20 comprises a circuit-switched mobile network 24 and a packet-switched network 28, each viewed as a separate communication domain. Typically, the communication domains of system 20 are different from one another. In some embodiments, however, system 20 may comprise two communication domains conforming to the same standard, protocol or access method.

In alternative embodiments, the communication domains of system 20 may comprise, for example, Wireless Local Area Networks (WLAN), Wi-Fi networks, WiMax Networks, Code Division Multiple Access (CDMA) networks such as CdmaOne, CDMA2000 and EvDo, Global System for Mobile communication (GSM) networks, Universal Mobile Telecommunication System (UMTS) and other third generation (3G) networks, fourth generation (4G) networks such as Long-Term Evolution (LTE) networks, IP Multimedia Subsystem (IMS) networks, wireline networks of different kinds, or any other suitable communication networks. The communication domains may comprise either circuit-switched or packet-switched networks.

System 20 may comprise any number of communication domains, which are typically but not necessarily operated by the same service provider. The methods and systems described hereinbelow enable the service provider to converge and unify the services provided by system 20, as well as to manage the subscribers and terminals across the different communication domains of the system.

Terminals 22 conduct calls via network 20. Although the embodiments described herein refer mainly to voice calls, in the context of the present patent application and in the claims, the term "call" is used in a wider sense to describe any type of communication session with a terminal 22, such as, for example, voice calls, short message service (SMS) messages, multimedia messaging service (MMS) messages, SIP instant messages, IP connections, voice over IP sessions and multimedia sessions.

In the exemplary configuration of FIG. 1, mobile network 24 provides connectivity and ancillary call services to cellular terminals 32, such as cellular phones, cellular modems and adapters, and/or any other type of cellular terminals. For the sake of simplicity, the description that follows will refer mainly to cellular phones, although the methods and systems described herein can be used in conjunction with any other type of cellular terminals and wireless communication clients.

Cellular phones 32 register with one or more mobile switching centers (MSC) 36, typically via base stations and base station controllers (not shown), as is known in the art. In some cases, a particular MSC may perform the function of a gateway MSC (GMSC) that accept incoming calls from outside of network 24, as a serving MSC (S-MSC) serving a particular phone 32, or both.

A home location register (HLR) 40 serves as the main identity database of network 24. HLR 40 stores subscriber and terminal information, such as the identities of the subscribers and terminals used in system 20. In some embodiments, HLR 40 may store access privileges, service parameters and any additional information related to the subscribers and/or terminals of system 20. As will be shown below, HLR 40 has a central role in determining how calls are routed to and from a particular cellular phone.

In some embodiments, the functions of HLR 40 described herein can be carried out by any other suitable network element comprising an identity database, which is interrogated by incoming and/or outgoing calls. Thus, HLR 40 in this context is an exemplary embodiment of an identity database.

In some embodiments, at least some of the ancillary call services provided by network 24 comprise intelligent network (IN) services, as are known in the art. As such, network 24 comprises one or more service control points (SCP) 44. Generally, each SCP comprises a network element that receives triggers from an MSC or other network element and provides a particular ancillary call service. IN services may comprise, for example, toll-free ("1-800") services, charging/billing services or prepaid services. Network 24 may also comprise additional network elements known in the art.

In the exemplary configuration of FIG. 1, the elements of network 24 are interconnected by a circuit-switched public land mobile network (PLMN) operating in accordance with the well-known signaling system 7 (SS7) protocol. Network 24 is partitioned into a connectivity layer, which comprises switching elements such as MSCs 36 and possibly HLR 40, and a service layer, which comprises the SCPs. The network elements in the connectivity layer handle tasks that are related to setting-up and managing call connections between terminals 22, e.g., call set-up, call-state management and call progress control. The connectivity layer is also sometimes referred to as a session control layer. The elements in the service layer, on the other hand, handle provisioning of various ancillary call services to the calls that are set-up and managed by the connectivity layer. Specific examples of ancillary services that may be provided by the service layer are described further below.

Packet network 28 operates in accordance with the well-known session initiation protocol (SIP). Network 28 provides connectivity and ancillary call services to IP terminals 52 such as SIP phones, voice over IP (VoIP) phones, IP multimedia terminals and/or any other type of IP terminals. For the sake of simplicity, the description that follows will refer mainly to SIP phones, although the methods and systems described herein can be used in conjunction with any other type of IP terminal.

In some embodiments, network 28 operates in accordance with the IMS architecture cited above. Like network 24, network 28 is also partitioned into a connectivity layer (also referred to as a session control layer) and a service layer. As explained above with respect to network 24, the elements in the connectivity layer of network 28 (e.g., switching elements) handle tasks that are related to setting-up and managing call connections between terminals 22, whereas the elements of the service layer of network 28 handle provisioning of ancillary call services to the calls that are set-up and managed by the connectivity layer.

In the connectivity layer, in accordance with the SIP protocol, a call state control function (CSCF) 56 serves as a database that registers and authenticates SIP phones 52 and handles session control for these phones. Active SIP phones typically register with the CSCF. The CSCF is thus able to provide a routable address, such as an IP address, with which the SIP phone is currently associated. In some embodiments, the CSCF comprises a standalone network element. In alternative embodiments, the functionality of the CSCF can be integrated into other network elements, as will be explained below. In the service layer of network 28, one or more SIP application servers (AS) 60 provide particular ancillary call services.

The two communication domains (networks 24 and 28) are connected by one or more media gateways (MGW) 64 controlled by media gateway controllers (MGC) 68. Media gateways, as are known in the art, are located at the edge of a multi-service packet network and provide media translation between the protocols of disparate networks, such as between networks 24 and 28. For example, in the configuration of FIG. 1, MGW 64 translates the time division multiplexing (TDM) media formats of network 24 into IP-formatted media as required in network 28, and vice versa. MGC 68 (sometimes also referred to as a Softswitch) provides translation of signaling and control protocols between the communication domains. In the example of FIG. 1, MGC 68 translates between the SS7 and SIP protocols used by networks 24 and 28, respectively.

MGW 64 and MGC 68 provide media and control translation, both related to the connectivity layer of networks 24 and 28. However, in order to provide full service-level unification of the two networks, it is desirable to provide convergence and translation at the service level. These service-level convergence functions are performed by a convergence server (CS) 72 (which may alternatively be referred to as a service broker), which is connected to networks 24 and 28, and typically also to MGC 68. The internal structure of CS 72, as well as methods for ancillary service unification carried out using CS 72, are described below. Other aspects of CS operation, such as call processing and identity management, are addressed in U.S. patent application Ser. No. 11/362,273, cited above.

Although the embodiments described herein refer to the service-level convergence of an SS7 network with a SIP network, various other types of communication domains that can be converged will be apparent to those skilled in the art. For example, the methods and systems described herein can be used to provide service-level convergence for dual-mode or multi-mode terminals 76, which support two or more communication domains in a single user terminal. As another example, IP network 28 may comprise a WLAN network that provides services to wireless SIP terminals. Network 24 may comprise, for example, a wireline SS7 network comprising other types of switching elements, such as C4/C5 switches.

Figure 2:
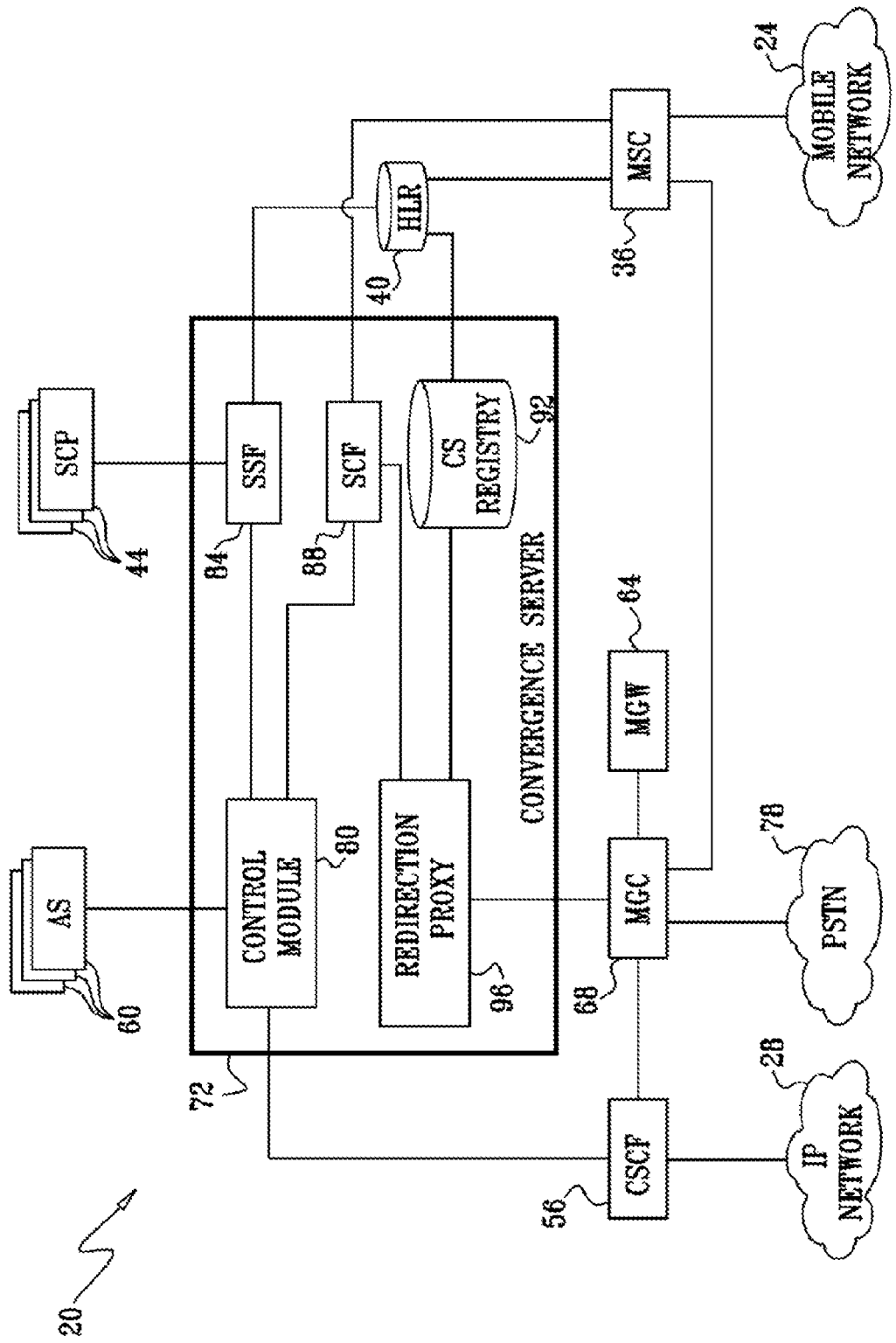
FIG. 2 is a block diagram that schematically illustrates elements of a convergence server, in accordance with an embodiment of the present invention.

FIG. 2 is a block diagram that schematically illustrates elements of convergence server 72 and their interaction with elements of system 20, in accordance with an embodiment of the present invention. In the system configuration of FIG. 2, MGC 68 is also connected to a public switched telephone network (PSTN) 78, from which incoming calls may arrive and to which outgoing calls may be destined. CS 72 comprises a control module 80, which performs the different management and coordination functions of the server. These functions are sometimes referred to as service capability interaction management (SCIM) functions. Module 80 also serves as a network interface for communicating with CSCF 56 and with SIP application servers 60 of network 28. In alternative embodiments, the functions of CSCF 56 may be integrated as part of CS 72 or MGC 68.

A service switching function (SSF) 84 serves as a network interface for communicating with SCPs 44 of network 24. The SSF produces triggers that invoke the different SCPs to provide the required services. In embodiments in which network 24 conforms to the IN architecture, SSF 84 communicates with SCPs 44 using IN application protocol (INAP). SSF 84 also interrogates HLR 40 as part of the call processing methods carried out by the CS. A service control function (SCF) 88 serves as an interface with MSCs 36 of network 24. Typically, the SCF interacts with the MSCs similarly to a SCP.

CS 72 comprises a CS registry 92, which serves as a visitor location register (VLR) for subscribers of system 20. CS 72 also comprises a redirection proxy 96, which stores contexts of calls processed by CS 72. Typically, convergence server 72 comprises a general-purpose computer, which is programmed in software to carry out the functions described herein. The software may be downloaded to the CS in electronic form, over a network, for example, or it may alternatively be supplied to the computer on tangible media, such as CD-ROM.

Providing Unified Services

The methods and systems described herein enable a service provider to unify the ancillary call services provided to subscribers of all communication domains of system 20 (networks 24 and 28 in the example of FIG. 1). Some of these subscribers may own multiple terminals in different communication domains, as described above. Other subscribers may use only a single terminal in a single domain. Some aspects of service unification are also described in PCT International Publication WO 2002/012976, which is incorporated herein by reference.

In some embodiments, CS 72 may invoke various kinds of ancillary call services regardless of whether they are carried out by a SCP 44 in network 24 or by a SIP application server in network 28. Thus, for example, a subscriber using a cellular phone in network 24 may be offered a service that is implemented in a SIP application server in network 28, and vice versa. Furthermore, in some embodiments, ancillary call services carried out by service platforms in different communication domains can be invoked during a single call. For example, an incoming call may invoke a call screening service running on a SIP AS in network 28, and an abbreviated dialing service running on a SCP in network 24. Invoked services may be provided to the originating side (referred to as O-side services) and/or to the terminating side (referred to as O-side services) of a call.

By using the techniques described herein, system 20 (and in particular CS 72) can provide various kinds of ancillary call services to terminals 22. These services are provided by service platforms (e.g., SCP 44 or SIP AS 60) in the service layers of network 24 and/or 28. Ancillary call services that can be provided to terminals 22 may comprise, for example, billing services, toll-free ("1-800") services, prepaid services, abbreviated dialing services, Virtual Private Network (VPN) services, private dialing plans, shared directory services, Interactive Voice Response (IVR) services, call screening services, multiple call appearance services, Automatic Call Distribution (ACD) services, attendant services and/or any other suitable type of service.

During a given call, system 20 may invoke and provide any suitable ancillary service or services running on a service platform (e.g., SCP) in network 24 and/or any suitable service or services running on a service platform (e.g., SIP AS) in network 28. The services may be provided to a terminal 32 in network 24 and/or to a terminal 52 in network 28 during the call. In some embodiments, one or more of the services are provided to a terminal at one end of the call, and one or more of the services are provided to a terminal at the other end of the call.

The different ancillary call services that may be provided by the service platforms in networks 24 and 28 may be classified in several categories. Some service types, such as payment-related services (e.g., billing services, prepaid services and toll-free services), are unrelated to the connectivity provided by the connectivity layers, i.e., to the path via networks 24 and 28 traversed by the call. Other service types, such as call screening, do not themselves create or enforce connectivity, but provide to the connectivity layers information that is used to apply or enforce connectivity. In the present context, tasks such as call routing or setting-up of two-party or multi-party calls are not regarded as ancillary call services, since they are related to low-level connectivity and session control functions that are handled by the connectivity layers.

The ability to unify ancillary call services across the different domains of system 20 enables the service provider to avoid duplication of service platforms. When using previously-known network solutions, a service provider wishing to offer a particular service over a mobile network and a packet network has to deploy separate SIP AS and SCP platforms, both running the same service. By contrast, the methods and systems described herein enable the provider to deploy only a single unified service platform, either a SCP or a SIP AS, and use this platform to offer the service to subscribers of all communication domains.

In some cases, a service provider is in the process of migrating from a legacy network to a new generation network. By unifying the services across the legacy and new generation networks, the service provider is able to invest in adding services and service platforms only in the new generation network. The provider can minimize further investments in the legacy network, while still offering every service of the new generation network to legacy network subscribers.

Figure 3:
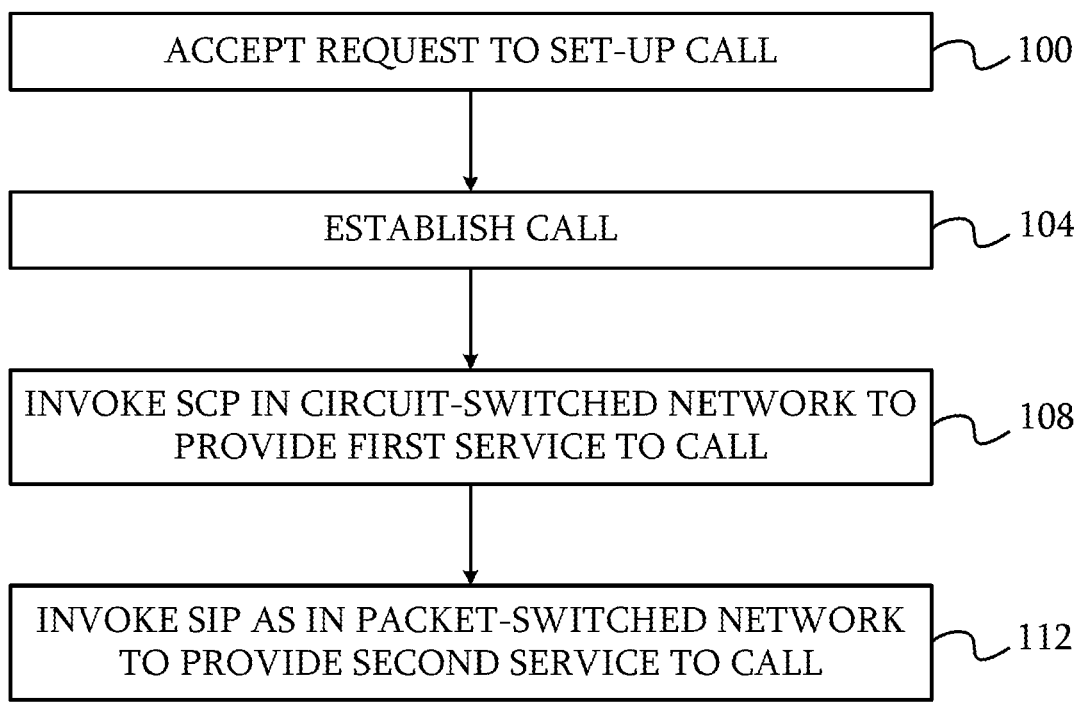
FIG. 3 is a flow chart that schematically illustrates a method for providing unified services across multiple communication domains, in accordance with an embodiment of the present invention.

FIG. 3 is a flow chart that schematically illustrates a method for providing unified ancillary call services across multiple communication domains, in accordance with an embodiment of the present invention. The method begins with CS 72 accepting a request to set up a call for a certain communication terminal, at a call acceptance step 100. The terminal for which the call is to be established may belong to network 24 and/or to network 28. The CS establishes the requested call, at a call set-up step 104.

In particular, the requested call involves providing certain ancillary call services, which may implemented in various service platforms (e.g., SCPs and/or SIP ASs) in system 20. In the present example, CS 72 invokes a certain SCP in network 24 to provide a certain ancillary service to the call, at a first invocation step 108. The CS invokes a certain SIP AS in network 28 to provide another ancillary service to the same call, at a second invocation step 112. The invoked service platforms provide their respective services to the call.

Although the example of FIG. 3 refers to a single SCP and a single SIP AS, the CS may invoke any desired number and any desired types of service platforms in networks 24 and 28 to provide ancillary services to a given call. Several examples of service types have been listed above. Alternatively, any other suitable type of service can be invoked and provided.

Further aspects of providing services across multiple communication domains are described in U.S. patent application Ser. No. 11/362,273, cited above, and in U.S. Patent Application Publication 2007/0263599, which is assigned to the assignee of the present patent application and whose disclosure is incorporated herein by reference.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
in an environment comprising a circuit-switched network, which comprises a first connectivity layer comprising one or more first switching elements and a first service layer comprising one or more first service platforms, and a packet-switched network, which comprises a second connectivity layer comprising one or more second switching elements and a second service layer comprising one or more second service platforms, accepting a request to set up a call for a communication terminal associated with one or more of the networks;
establishing the call responsively to the request via one or more of the switching elements; and
invoking at least one of the first service platforms in the first service layer of the circuit-switched network to provide a first ancillary call service to the call, and at least one of the second service platforms in the second service layer of the packet-switched network to provide a second ancillary call service to the call.

2. The method according to claim 1, wherein the circuit-switched network operates in accordance with a signaling system 7 (SS7) protocol.

3. The method according to claim 1, wherein the one of the first service platforms comprises a service control point (SCP) and wherein the first ancillary call service comprises an intelligent network (IN) service.

4. The method according to claim 1, wherein the packet-switched network comprises an Internet Protocol (IP) network, and wherein the one of the second service platforms comprises a Session Initiation Protocol (SIP) Application Server (AS).

5. The method according to claim 1, wherein the packet-switched network comprises an IP Multimedia Subsystem (IMS) network.

6. The method according to claim 1, wherein the networks comprise a Long-Term Evolution (LTE) network.

7. The method according to claim 1, wherein the first and second ancillary call services are selected from a group of service types consisting of a payment-related service, an abbreviated dialing service, a Virtual Private Network (VPN) service, a private dialing plan, a shared directory service, an Interactive Voice Response (IVR) service, a call screening service, a multiple call appearance service, an Automatic Call Distribution (ACD) service and an attendant service.

8. A convergence server, comprising:
first and second network interfaces, which are respectively arranged to communicate with a circuit-switched network and a packet-switched network, wherein the circuit-switched network comprises a first connectivity layer comprising one or more first switching elements and a first service layer comprising one or more first service platforms, and wherein the packet-switched network comprises a second connectivity layer comprising one or more second switching elements and a second service layer comprising one or more second service platforms; and
a processor, which is arranged to accept a request to set up a call for a communication terminal associated with one or more of the networks, to establish the call responsively to the request via one or more of the switching elements, and to invoke at least one of the first service platforms in the first service layer of the circuit-switched network to provide a first ancillary call service to the call, and at least one of the second service platforms in the second service layer of the packet-switched network to provide a second ancillary call service to the call.

9. The convergence server according to claim 8, wherein the circuit-switched network operates in accordance with a signaling system 7 (SS7) protocol.

10. The convergence server according to claim 8, wherein the one of the first service platforms comprises a service control point (SCP) and wherein the first ancillary call service comprises an intelligent network (IN) service.

11. The convergence server according to claim 8, wherein the packet-switched network comprises an Internet Protocol (IP) network, and wherein the one of the second service platforms comprises a Session Initiation Protocol (SIP) Application Server (AS).

12. The convergence server according to claim 8, wherein the packet-switched network comprises an IP Multimedia Subsystem (IMS) network.

13. The convergence server according to claim 8, wherein the networks comprise a Long-Term Evolution (LTE) network.

14. The convergence server according to claim 8, wherein the first and second ancillary call services are selected from a group of service types consisting of a payment-related service, an abbreviated dialing service, a Virtual Private Network (VPN) service, a private dialing plan, a shared directory service, an Interactive Voice Response (IVR) service, a call screening service, a multiple call appearance service, an Automatic Call Distribution (ACD) service and an attendant service.

15. A communication system, comprising:
a circuit-switched network, which comprises a first connectivity layer comprising one or more first switching elements and a first service layer comprising one or more first service platforms;
a packet-switched network, which comprises a second connectivity layer comprising one or more second switching elements and a second service layer comprising one or more second service platforms; and
a convergence server, which is connected to the circuit-switched and packet-switched networks and is arranged to accept a request to set up a call for a communication terminal associated with one or more of the networks, to establish the call responsively to the request via one or more of the switching elements, and to invoke at least one of the first service platforms in the first service layer of the circuit-switched network to provide a first ancillary call service to the call, and at least one of the second service platforms in the second service layer of the packet-switched network to provide a second ancillary call service to the call.

16. The system according to claim 15, wherein the circuit-switched network operates in accordance with a signaling system 7 (SS7) protocol.

17. The system according to claim 15, wherein the one of the first service platforms comprises a service control point (SCP) and wherein the first ancillary call service comprises an intelligent network (IN) service.

18. The system according to claim 15, wherein the packet-switched network comprises an Internet Protocol (IP) network, and wherein the one of the second service platforms comprises a Session Initiation Protocol (SIP) Application Server (AS).

19. The system according to claim 15, wherein the packet-switched network comprises an IP Multimedia Subsystem (IMS) network.

20. The system according to claim 15, wherein the networks comprise a Long-Term Evolution (LTE) network.

21. The system according to claim 15, wherein the first and second ancillary call services are selected from a group of service types consisting of a payment-related service, an abbreviated dialing service, a Virtual Private Network (VPN) service, a private dialing plan, a shared directory service, an Interactive Voice Response (IVR) service, a call screening service, a multiple call appearance service, an Automatic Call Distribution (ACD) service and an attendant service.

22. A computer software product for communication, the product comprising a computer-readable medium, in which program instructions are stored, which instructions, when read by a computer, cause the computer to communicate with a circuit-switched network that includes a first connectivity layer including one or more first switching elements and a first service layer including one or more first service platforms, to communicate with a packet-switched network that includes a second connectivity layer including one or more second switching elements and a second service layer including one or more second service platforms, to accept a request to set up a call for a communication terminal associated with one or more of the networks, to establish the call responsively to the request via one or more of the switching elements, and to invoke at least one of the first service platforms in the first service layer of the circuit-switched network to provide a first ancillary call service to the call, and at least one of the second service platforms in the second service layer of the packet-switched network to provide a second ancillary call service to the call.

* * * * *